Sept. 14, 1926.

C. A. NICHOLSON

BAGGAGE TRUCK

Filed Sept. 17, 1925

1,599,671

INVENTOR
Charles A. Nicholson
By Kay, Totten & Martin,
Attorneys

Patented Sept. 14, 1926.

1,599,671

UNITED STATES PATENT OFFICE.

CHARLES A. NICHOLSON, OF NEW CASTLE, PENNSYLVANIA.

BAGGAGE TRUCK.

Application filed September 17, 1925. Serial No. 56,891.

My invention relates to trucks, and particularly to trucks of the character wherein it is desirable to provide steering or guiding wheels at each end thereof so that they may be operated with equal facility from either end.

One object of my invention is to provide a truck having the axles at each of its ends swiveled, together with means for rigidly locking either of said axles, in transverse alignment, against swiveling movement.

Another object of my invention is to provide a swivel lock which is automatically movable to unlocked and locked positions, respectively, as the tongue or handle of the vehicle to which the device is applied, is actuated to pull the truck or is moved to inoperative position.

Figure 1:
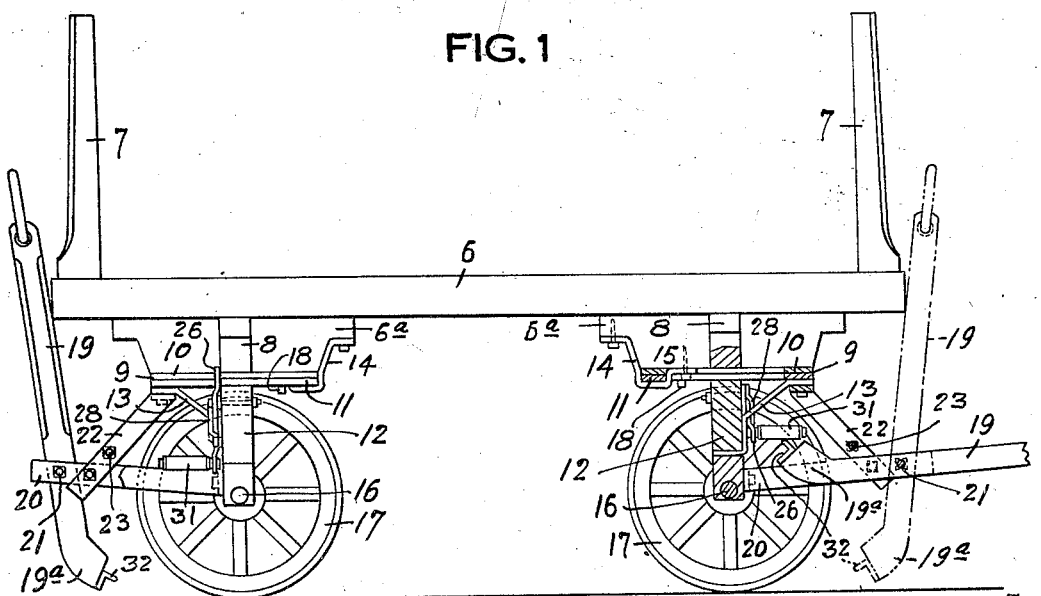
Figure 4:
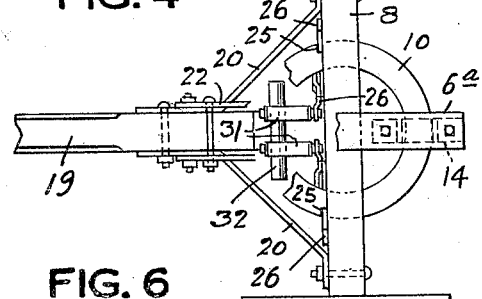
Figure 6:
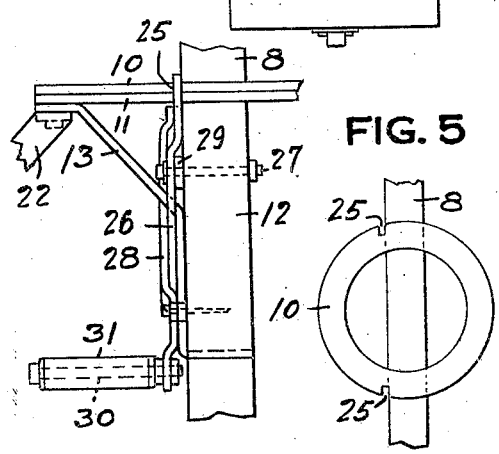
Figure 2:
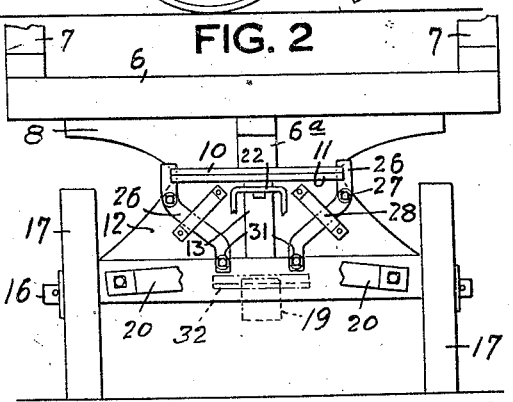
Figure 3:
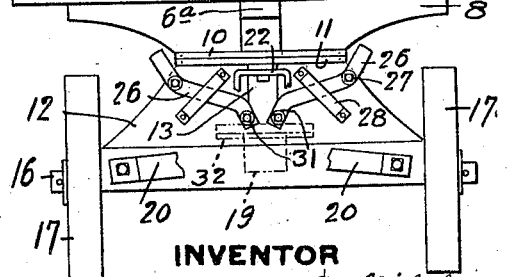

Referring to the drawing Fig. 1 is a view, partially in side elevation and partially in section, of a baggage truck equipped with my invention; Fig. 2 is an end elevational view thereof with the vehicle tongue removed, showing the locking members in operative positions; Fig. 3 is a similar view showing the locking members in their inoperative positions; Fig. 4 is a fragmentary plan view showing the manner in which the handle engages the locking members to move them to inoperative position; Fig. 5 is a plan view of one of the swivel members of the fifth wheel; and Fig. 6 is a side elevational view, on an enlarged scale, of one of the locking members.

I have shown my invention as applied to a vehicle of the baggage truck type having a body or platform portion 6 that is provided with the usual standards 7 at its ends. Bolsters or sills 8 are secured to the underside of the body 6.

Fifth wheels are provided at each end of the truck, and the upper plate 10 of each of these wheels is connected to the bolster 8 and the blocks 6ª that are fastened to the body 6. The lower swivel member 11 of the fifth wheel 9 is connected to what might be termed a truck bolster 12 and also by means of a strut 13 which, at its upper end, is bolted to the member 11 and its lower end is connected to the bolster. Yoke members 14 are secured at their upper ends to the blocks 6ª and adjacent to their lower ends extend around the underside of the swivel member 11 and are connected through the upper plate 10 to the blocks 6ª as indicated more clearly at the point 15 in Fig. 1. Additional fastening means, (not shown) may be provided between the upper plate 10 and bolster 8 and lower plate 11 and the truck bolster 12. Axles 16 are secured to the lower side of the truck bolsters 12 and the usual wheels 17 mounted thereon. Stop lugs 18 extend downwardly from the swivel member 11 in position to engage the edges of the yoke 14 to limit the swiveling movement of the axles.

A handle 19 is connected to the axle 16 by means of braces or tie members 20 whose inner ends are bolted to the axle and through the outer ends of which a bolt 21 extends to serve as a pivotal mounting for the handle.

Brace members 22, in the form of a yoke, are bolted at their upper ends to the fifth wheel 11 and at their lower ends are bolted to the members 20. A pin 23 extends through the members 22 to limit the upward movement of the inner end of the handle 19. The handle 19 may be of the usual form, weighted at the point 19ª to normally hold the handle in its upright position, as indicated at the left hand side of Fig. 1.

The parts thus far described may be operated somewhat after the manner of the usual form of baggage truck, but provision must be made for firmly locking the fifth wheels against swiveling movement, since when a truck is being pulled from one end, even a slight swiveling movement of the wheels at the other end would cause the wheels to bind on their axles and would perhaps also deflect said other end of the truck to a dangerous position, such as against a train if the truck were employed on a station platform, or off the platform. By providing a fifth wheel at each end, the truck can be readily operated from either end, thus avoiding the necessity of pushing it backward, which would be dangerous on station platforms since injury to passengers might result. Also, the direction of movement of a truck is more difficult to control when being steered from the rear end. On the other hand, these trucks are often used in close quarters where there is insufficient room to turn them completely around.

In order to lock the fifth wheels I provide slots 25 at each side thereof in such position that when the axles 16 are in perfect alignment with respect to the bolsters 8, the notches 25 are also in alignment. One set of notches would be sufficient for each fifth wheel but I prefer to provide two sets whose peripheral locations in the fifth wheel members are shown more clearly in Figs. 4 and 5. This arrangement permits of two locks for each fifth wheel and therefore renders it more certain that the wheels will be securely locked when desired, and also permits convenient manual actuation of the locking bars to be hereinafter described, from either side of the handle 19.

The manner in which the fifth wheels are automatically locked and unlocked will now be described. The notches or slots 25 of the lower swivel member 11 are normally in alignment with the notches in the upper plate 10 so that locking bars 26 may enter the aligned notches as shown in Fig. 2, to rigidly hold the lower plate 11, and consequently the truck bolster 12, against swiveling movement. The bars 26 are pivotally connected to the bolster 12 by a pin or bolt 27. Guide plates 28 are secured to the bolster 12 and serve as guides for the bars 26. A washer 29 is interposed between the upper portion of the bar 26 and the bolster 12 to serve as a bearing member, and the upper end of the bar 26 is therefore offset in order to lie closely against the bolster.

At their lower ends, each of the locking bars 26 is provided with a pin or bolt 30 that carries a rotatable sleeve 31. The bolt 30 and sleeve 31 are of such diameter that they have sufficient weight to normally hold the bars 26 in locking position, as shown in Fig. 2. The truck handle 19 is provided with a transversely extending bar 32 which, when the outer end of the handle is lowered, is brought into engagement with the under-surfaces of the sleeves 31 to thereby move the bars 26 about their pivots and out of engagement with the notches 25, the sleeves 31 serving as antifriction rollers when engaged by the cross bar 32.

It will thus be seen that when the operator grasps the handle to pull the truck, the lower end of such handle is swung to effect release movement of the locking bars at that end of the truck. On the other hand, the handle at the opposite end of the truck will be in substantially upright position, by reason of its weighted portion 19$^a$, and the fifth wheels at such end therefore locked.

The foregoing arrangement insures against accidents resulting from the operator carelessly leaving the fifth wheel at one end of the truck unlocked, while he is operating the truck from its other end. Furthermore, the operator can at all times manipulate the truck from either end with the assurance that the locking members for the fifth wheels are in their proper positions.

I claim as my invention:

1. The combination with a vehicle having a body portion, a swiveled axle and a tongue, of means for locking said axle against swiveling movement, comprising a locking device mounted independently of the tongue, and means associated with said tongue for actuating said locking device upon movement of the tongue.

2. The combination with a vehicle having a swiveled axle and a tongue, of a locking device for normally holding said axle against swiveling movement and mounted independently of the tongue, and means operative upon manipulation of the handle to pull the truck for moving said locking device to release position.

3. The combination with a vehicle having an upper swivel member, and a lower swivel member, each provided with offset portions, of a pivoted tongue, means for locking said swivel members against relative movement, comprising a lever pivotally mounted intermediate its ends and having one of its ends adapted to engage said offset portions, the other end of the lever being yieldably held in one extreme position of movement and disposed in the path of movement of the tongue.

4. The combination with a vehicle body provided with a swiveled axle and with a tongue normally held out of horizontal position, of a locking device for said swivel member, and means for moving said locking device to release position when the tongue is moved to substantially horizontal position, the said locking device being supported independently of the tongue.

In testimony whereof I, the said CHARLES A. NICHOLSON, have hereunto set my hand.

CHARLES A. NICHOLSON.